US005141691A

United States Patent [19]

Pace

[11] Patent Number: 5,141,691

[45] Date of Patent: Aug. 25, 1992

[54] FEEDLOCK AND METHOD FOR EXTRUDING PLANAR LAMINATES

[75] Inventor: Jerry D. Pace, Canton, N.C.

[73] Assignee: Champion International Corporation, Stamford, Conn.

[21] Appl. No.: 760,155

[22] Filed: Sep. 16, 1991

[51] Int. Cl.[5] ........................ B29C 47/06; B29C 47/92

[52] U.S. Cl. .................................... 264/171; 264/40.1; 264/40.7; 425/131.1; 425/133.5; 425/462; 425/141

[58] Field of Search ...................... 264/171, 40.1, 40.7; 425/131.1, 133.5, 462, 141

[56] References Cited

U.S. PATENT DOCUMENTS

| | | | |
|---|---|---|---|
| 3,302,239 | 2/1967 | Senecal | 425/131.1 |
| 3,769,380 | 10/1975 | Wiley | 264/171 |
| 3,860,036 | 1/1975 | Newman, Jr. | 425/131.1 |
| 4,265,693 | 5/1981 | Nishimoto et al. | 425/131.1 |
| 4,405,547 | 9/1983 | Koch et al. | 425/131.1 |
| 4,600,550 | 7/1986 | Clören | 264/40.7 |
| 4,695,236 | 9/1987 | Predohl et al. | 425/133.5 |
| 4,856,975 | 8/1989 | Gearhart | 425/131.1 |
| 4,880,370 | 11/1989 | Krumm | 425/133.5 |

FOREIGN PATENT DOCUMENTS

| | | | |
|---|---|---|---|
| 61-270134 | 11/1986 | Japan | 425/131.1 |
| 62-138224 | 6/1987 | Japan | 425/131.1 |
| 62-240525 | 10/1987 | Japan | 425/131.1 |

*Primary Examiner*—Jeffery Thurlow
*Attorney, Agent, or Firm*—Evelyn M. Sommer

[57] ABSTRACT

A feedblock is provided for producing a laminated plastic sheet with each layer of the laminated sheet being of substantially uniform thickness. The feedblock includes a plurality of lamella channels each of which is of non-rectangular cross-sectional shape. The particular non-rectangular cross-sectional shape of each lamella channel is selected to offset the tendency of the extruded plastic to thin and spread non-uniformly. Thus, the thinning and spreading of the extruded plastic will urge the plastic into a layer of substantially uniform thickness.

5 Claims, 2 Drawing Sheets

FEEDLOCK AND METHOD FOR EXTRUDING PLANAR LAMINATES

BACKGROUND OF THE INVENTION

A very substantial commercial demand exists for extruded plastic sheets. The plastic sheets may be used for protective wraps, for bags, or for coatings applied to substrates such as paperboard or wood. Plastic sheets often must meet specifications defining gas permeability, water permeability, strength, flexibility, light transmissivity, photo-degradability and reception to various adhesives and ink.

A unitary extruded sheet of a single polymer often will be unable to meet all of the various requirements for the intended end use of the sheet. As a result, laminated plastic sheets are widely employed, with the various laminated layers being formed from different polymers. Each layer may be extruded from a polymer with a specified characteristic in accordance with the requirements of the finished product. Thus, one laminated plastic layer may be selected for its strength, another layer may be selected as being substantially impermeable to gas, while another layer may be selected for good reception of adhesive and/or ink.

A sample specified laminated plastic sheet is depicted in FIG. 1 and is identified by the numeral 10. The laminated plastic sheet 10 is formed by three separate plastic layers 12, 14 and 16. The particular polymer defining each layer 12–16 is selected in view of characteristics attributable to that polymer. Additionally, the respective thicknesses of each layer 12–16 are specified in accordance with those characteristics. For example, a first layer 12 of a specified thickness "a" may be selected for its strength. A layer 12 with a thickness substantially less then "a" may be too weak, while a layer 12 with a thickness substantially greater then "a" may be too rigid for the specified end use. Similarly, the layer 14 may be specified to have a thickness "b" to achieve a required oxygen impermeability. A layer 14 with a thickness less then "b" may transmit too much oxygen therethrough, while a layer 14 with a thickness greater then "b" may be unnecessarily wasteful of the plastic and may affect flexibility of the laminated sheet 10. Similarly, the polymer of layer 16 may be selected for receptivity of ink and adhesives. The specified thickness "c" may be required to prevent transmission of ink or adhesives into adjacent layer 14 or 12. An actual specified laminated plastic sheet 10 may have many more layers than the three of the sample sheet 10 depicted in FIG. 1.

The laminated plastic sheet 10 may be manufactured with an extruder having a specially manufactured manifold into which various streams of molten polymer are fed. The manifold will be configured to spread and laminate the various polymer layers to define a laminated sheet 10 of approximately the specified dimensions. Special purpose manifolds can be very expensive to manufacture and offer little flexibility from one laminated sheet construction to another.

A more versatile manufacturing approach is to employ a feedblock in the extrusion apparatus. A prior art extrusion apparatus of this general type is depicted in FIGS. 2–4 and is identified generally by the numeral 18. The prior art extrusion apparatus 18 includes a plurality of entry ports 22, 24 and 26 which extend into a feedblock 28 for an initial extrusion of the polymer layers. The feedblock 28 communicates with a combining chamber 30 which thins and spreads the laminated layers prior to a die port 31. The prior art feedblock 28 comprises diverter plates 32, 34, 36 and 38 intermediate the entry ports 22–26 and the combining chamber 30. The diverter plates 32–38 are secured in face-to-face relationship with one another by bolts 40 and are machined to define rectangular lamella channels 42, 44 and 46 (each of uniform height) for receiving melt streams of polymers from the respective feed ports 22–26. Each prior art lamella channel 42–46 will define a depth selected as a function of the specified thickness "a", "b" or "c" of the respective layers 12–16 of the sheet 10 shown in FIG. 1.

Although feedblocks are widely employed, it is extremely difficult to achieve the specified configuration of the laminated plastic sheet 10 as shown in FIG. In this regard, it is necessary to closely match polymer viscosity in an effort to obtain uniform layer thicknesses across the width of the laminated plastic sheet 10. It has been found, however, that the laminated sheet produced from the prior art feedblock apparatus 28 will not produce the specified sheet configuration 10 depicted in FIG. 1, but rather resembles the sheet $10_1$ depicted in FIG. 5. In particular, the layers $12_1$, $14_1$ and $16_1$ of the sheet $10_1$ which are applied to a paperboard substrate 17 will be of varying thickness across the respective widths, including, for example, major thicknesses (above average thickness) adjacent opposed side edges of each layer and minor thicknesses (less than average thickness) at locations spaced inwardly from the side edges. One or more additional areas of major thicknesses of the layers $12_1$, $14_1$ and $16_1$ may further exist at more central regions of the sheet $10_1$. These variations in thickness will remain despite any down stream thinning that may occur in the prior art apparatus 10. As noted above, variations in the thickness of a plastic layer from the specified thickness can significantly alter the performance of the laminated sheet for its intended end use. For example, it may be difficult to subsequently adhere the laminated sheet materials $10_1$ to a substrate in view of the non-planar condition of opposed surfaces of the sheet. The sheet $10_1$ may be insufficiently flexible, too weak in selected locations, insufficiently impermeable to gas, or may exhibit a host of other problems at least locally thereon. Prior art attempts to deal with the problems depicted schematically in FIG. 5 primarily have been directed toward controlling the viscosity of the melt streams feeding into and/or passing through the extruder. These prior art attempts have been difficult to control and often have been ineffective.

In view of the above, it is an object of the subject invention to provide a feedblock assembly for a laminated plastic sheet with layers of uniform specified thicknesses.

It is another object of the subject invention to provide a feedblock assembly that can be readily modified to achieve a specified laminated plastic sheet construction.

SUMMARY OF THE INVENTION

The subject invention is directed to a feedblock formed from a plurality of metallic lamellas which may be selectively assembled together for achieving a specified laminated plastic sheet. The laminated sheet comprises a plurality of plastic layers each of which is of uniform thickness. The feed block includes opposed front and rear faces, a top, a bottom and opposed first and second sides. A plurality of the lamellas defining the feedblock are characterized by lamella channels extending from the front face to the rear face. The rear of each lamella channel is configured to receive a polymer melt stream of an extruder, and will spread and extrude the polymer melt stream. The lamella channels are disposed relative to one another to orient layers of polymer in specified locations for defining the laminated sheet.

According to the present invention at least one lamella channel is of non-rectangular cross-section along at least a portion of its length. More particularly, each lamella channel may be defined by first and second side walls extending generally parallel to the respective first and second sides of the feedblock. Each lamella channel further includes opposed top and bottom walls extending between the side walls and defining the thickness of the polymer layer extruded from the feedblock. At least one of the top and bottom walls of at least one lamella channel is non-planar. In particular, the non-planar wall of the lamella channel assumes an arcuate or curvilinear shape selected to offset the non-planar tendency of the polymer being extruded from the feedblock. In this regard, the non-planar configuration of the top and bottom walls of the lamella channel may define a major height (that is, the dimension which is perpendicular to both the width of the laminated sheet and direction of polymer flow) in regions where the polymer layer would otherwise have a minor thickness. Conversely, the lamella channel may define a minor height in regions where the polymer layer would otherwise have a major thickness. The regional height of the lamella channel is thus complementary to the thickness which the polymer layer would have had if produced in a lamella channel of uniform height. The differences in height dimensions across the width of the lamella channel are selected to ensure that the polymer layer produced thereby is of uniform thickness and substantially planar.

In a preferred embodiment, a plurality of the lamellas each are configured to define at least one non-planar top or bottom wall. The lamellas are disposed and oriented to ensure that each polymer layer in the extruded plastic laminated sheet is of uniform thickness such that the sum of the thicknesses is uniform across the entire width of the laminated sheet.

The subject invention may be practiced by first extruding a plastic sheet using the prior art feedblock with rectangular die channels. The thicknesses of the respective layers of the laminated sheet may then be measured to determine variations from a uniform thickness. This measured data may then be employed to determine the respective heights of the lamella channels required to achieve a uniform thickness for each layer. In particular, areas of each layer defining a minor thickness will correspond to areas on the lamella channel having a major height. Conversely, areas of each layer defining a major thickness will correspond to areas on a lamella channel defining a minor height.

DETAILED DESCRIPTION OF THE PREFERRED EMBODIMENT

Figure 6:
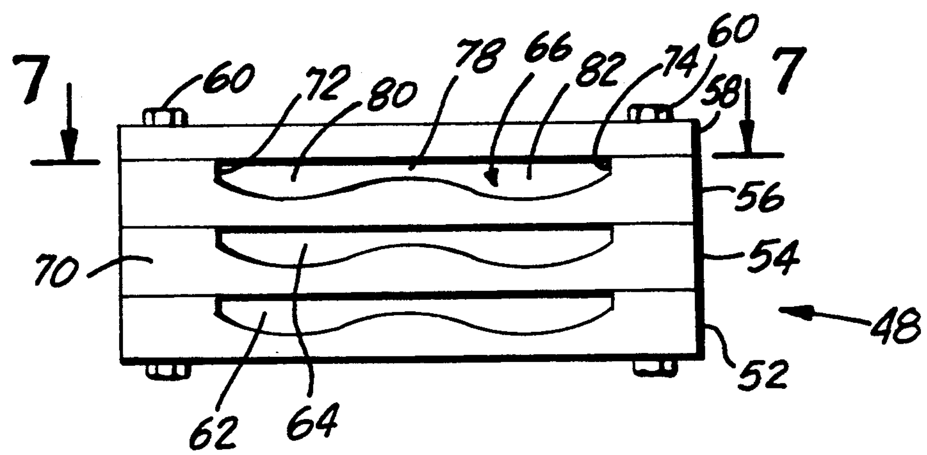
FIG. 6 is a cross-sectional view similar to FIG. 4 but showing the feedblock of the subject invention.
Figure 7:
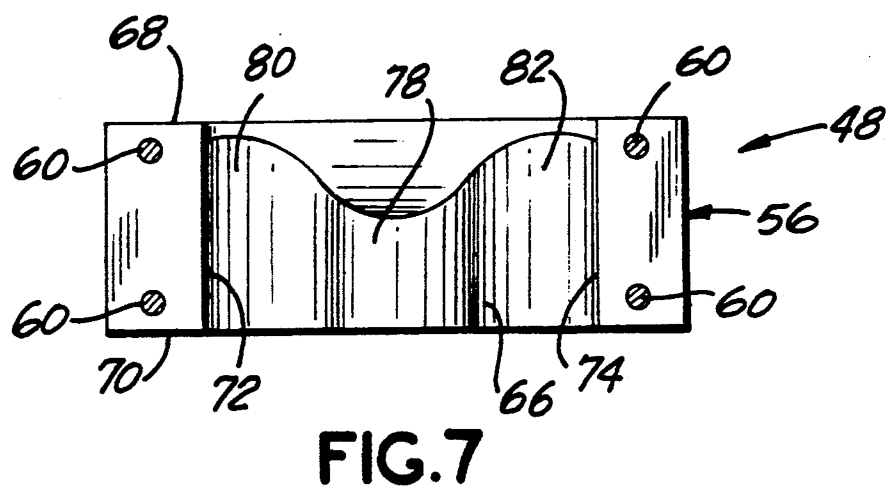
FIG. 7 is a cross-sectional view taken along line 7—7 in FIG. 6.

The feedblock of the subject invention is identified generally by the numeral 48 in FIGS. 6 and 7. The feedblock 48 is defined by lamellas 52, 54 and 56 and a cover lamella 58 which are secured in face-to-face relationship by bolts 60. The lamellas 52, 54 and 56 are machined to define lamella channels 62, 64 and 66 respectively. The feedblock 48 further is provided with a rear face 68 defining the portion thereof into which the feed ports (not shown) extend and a front face 70 which will communicate with a prior art combining chamber from which the separate polymer layers 12, 14 and 16 will be extruded.

Figure 5:
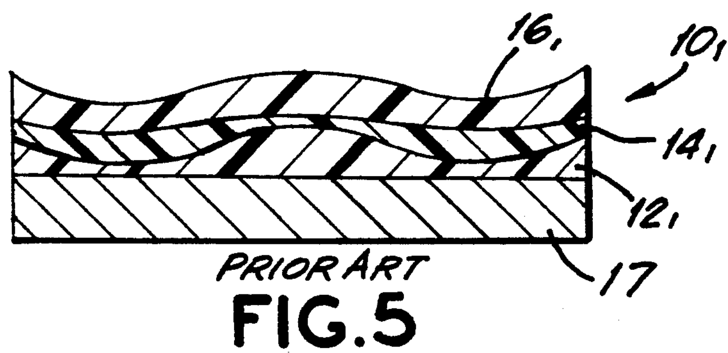
FIG. 5 is a cross-sectional view similar to FIG. 1 but showing a typical prior art plastic sheet produced by the prior art extruder of FIGS. 2–4.

The lamella channels 62, 64 and 66 are not of rectangular cross-sectional configuration as had been the case with the lamella channels 42, 44 and 46 of the prior art feedblock 28 described and illustrated above. Rather, with reference to the lamella 56 and as shown in FIGS. 6 and 7, the lamella channel 66 is defined by first and second substantially parallel side walls 72 and 74 spaced from one another by a distance corresponding to the preferred width of the layer 16 being extruded from the feedblock 48. The lamella channel 66 is further defined by a non-planar bottom wall 76 extending between the side wall 72 and 74. The bottom wall 76 of the lamella channel 66 is configured to define a generally rectangular opening to the lamella channel 66 adjacent to the rear face 68 of the feedblock 48. However, the bottom wall 76 assumes an arcuate cross-sectional shape at areas thereof closer to the front face 70 of the feedblock 48. The non-planar portion of the bottom wall 76 adjacent the front 70 of the feedblock 48 is configured to effectively offset the non-planar configuration of the layer $16_1$ of the prior art plastic sheet $10_1$ produced by the prior art feedblock 28. In this regard, the bottom wall 76 is configured to define a minor height for the lamella channel 66 at regions in proximity to the side walls 72 and 74 and also at a central region 78 disposed approximately mid-way between the side walls 72 and 74. The non-planar configuration of the bottom wall 66 further defines a major height for the lamella channel 66 at regions identified generally by the numerals 80 and 82 which are spaced inwardly from the side walls 72 and 74 and intermediate the regions of the bottom wall 76 defining a minor height for the lamella channel 66. A comparison of FIGS. 5 and 6 shows that the lamella channel 66 defines regions of minor height at locations generally corresponding to areas of the prior art plastic layer $16_1$ that had defined a major thickness. Conversely, the configuration of the bottom wall 76 defines a major height for the guide channel 66 at locations generally corresponding to regions of the layer $16_1$ which had defined a minor thickness. The bottom wall 76 thus has a polytonic curvilinear shape, that is, with interspersed areas of convex surface and concave surface. In view of this configuration of the bottom wall 76, the polymer extruded from the lamella channel 66 at the front face 70 of the feedblock 48 will tend to achieve a substantially uniform thickness across the width. In particular, the tendency of the extruded plastic to dimensionally change its thickness is offset by the non-planar cross-sectional configuration of the lamella channel 66, such that the dimensional changes of the extruded polymer urge that polymer layer 161 into a configuration of substantially uniform thickness as depicted for the layer 16 in FIG. 1.

With further reference to FIG. 6, the lamella channels 62 and 64 are of non-rectangular cross-sections similar to the lamella channel 66. As a result, the polymer layers 12 and 14 extruded from the lamella channels 62 and 64 will dimensionally change into layers of substantially uniform thicknesses as explained above.

Figure 1:
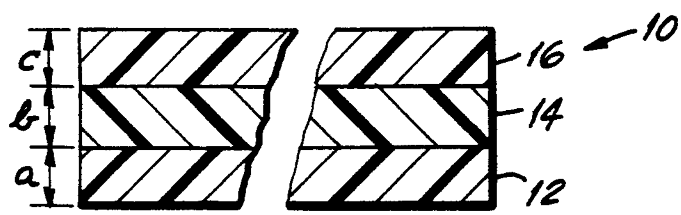
FIG. 1 is a cross-sectional view of a specified prior art laminated plastic sheet.
Figure 2:
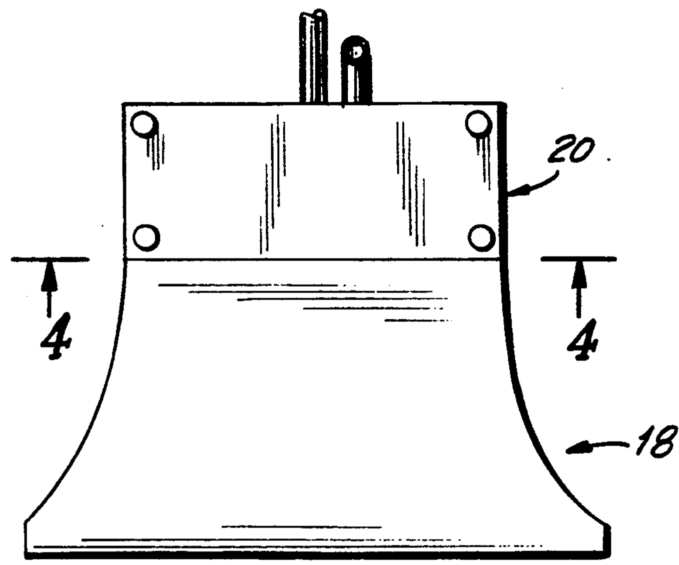
FIG. 2 is a top plan view of a prior art extruder incorporating a feedblock.
Figure 3:
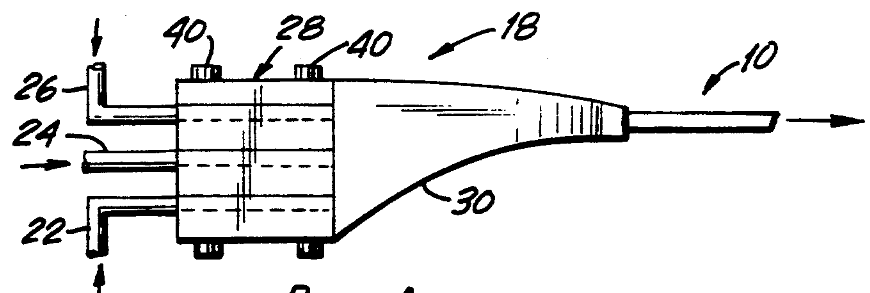
FIG. 3 is a side elevational view of the extruder depicted in FIG. 2.
Figure 4:
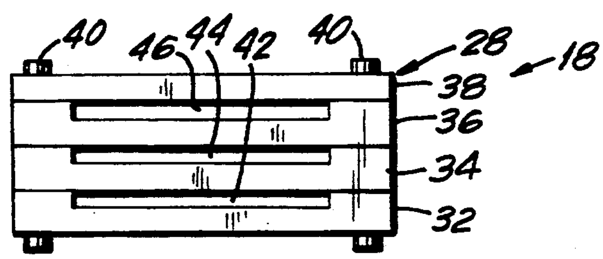
FIG. 4 is a cross-sectional view taken along line 4—4 in FIG. 2.

The various polymer layers 12, 14 and 16 may continue into a combining chamber similar to the prior art manifold 30 depicted in FIGS. 3 and 4 where the layers 12, 14 and 16 will be urged into a single laminated plastic sheet 10 of the specified width. The layers 12, 14 and 16 will be of substantially uniform thickness as they enter the thinning and spreading portions of the manifold, and hence will be spread into substantially uniform thickness across the width of the sheet 10 as depicted in FIG. 1.

While the invention has been described with respect to a preferred embodiment, numerous other embodiments within the scope of the appended claims will be apparent to those skilled in this art. In particular, the feedblock is not limited to merely three lamella channels, but rather may include fewer than three lamella channels or many more than three lamella channels. The particular non-rectangular cross-section of the lamella channels also is not limited to the illustrated embodiment, but will be selected in accordance with the tendencies of the particular polymers being extruded. For example, the number, locations and relative dimensions of the areas of major and minor height defined by each lamella channel may be differently disposed to achieve an extruded plastic member of uniform thickness.

I claim:

1. A method for extruding a multi-layer laminated plastic sheet with a plurality of layers of substantially uniform thickness, said method comprising the steps of:

extruding a multi-layer laminated plastic sheet through a first feedblock having a plurality of lamella channels, each of uniform cross section;

measuring the thicknesses of the respective plastic layers at a plurality of locations across the width of each layer;

providing a second feedblock with a plurality of channels corresponding respectively to the plurality of layers of the plastic sheet, each of said channels of the feedblock defining a selected non-rectangular cross sectional shape with a polytonic curvilinear cross section having interspersed regions of major height and minor height complementary to said measured thicknesses of said layers, for offsetting any non-uniform dimensions in the respective layers extruded through the first feedblock;

and extruding a plastic sheet comprised of a plurality of substantially uniform layers through the second feedblock.

2. A feedblock for extruding a plurality of layers of plastic for defining a multi-layer laminated plastic sheet, the feedblock comprising a plurality of lamella channels, each corresponding to one of the layers, at least one lamella channel having a non-rectangular cross section with a polytonic curvilinear cross section with at least two regions of major height separated by a region of minor height, the regional height of said cross section being complementary to the thickness of a layer of plastic which would be defined by a lamella of uniform height, thereby offsetting non-uniform spreading of the plastic being extruded.

3. A feedblock assembly as in claim 2 wherein the lamella channel defines said region of major height between the top and bottom walls at locations spaced inwardly from the sidewalls.

4. A feedblock assembly as in claim 2 wherein the lamella channel defines said region of minor height between the top and bottom walls at a location approximately mid-way between the first and second side walls.

5. A feedblock assembly as in claim 2 wherein the feedblock assembly includes a rear face for receiving a feed port for feeding a polymer melt stream into the lamella channel and a front face from which the polymer is extruded, the lamella channel being substantially rectangular adjacent the rear face of the feed block and being of said non-rectangular cross-sectional shape adjacent the front face thereof.

* * * * *